US011785428B2

(12) United States Patent
Thompson et al.

(10) Patent No.: US 11,785,428 B2
(45) Date of Patent: Oct. 10, 2023

(54) MOBILE RADIO

(71) Applicant: 3M INNOVATIVE PROPERTIES COMPANY, St. Paul, MN (US)

(72) Inventors: Darin Kyle Thompson, Huntersville, NC (US); Vincent Scott Garmon, Waxhaw, NC (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 17/635,971

(22) PCT Filed: Aug. 4, 2020

(86) PCT No.: PCT/IB2020/057374
§ 371 (c)(1),
(2) Date: Feb. 16, 2022

(87) PCT Pub. No.: WO2021/038341
PCT Pub. Date: Mar. 4, 2021

(65) Prior Publication Data
US 2022/0295238 A1  Sep. 15, 2022

Related U.S. Application Data

(60) Provisional application No. 62/890,898, filed on Aug. 23, 2019.

(51) Int. Cl.
*H04W 4/10* (2009.01)
*H04B 1/3827* (2015.01)

(52) U.S. Cl.
CPC .............. *H04W 4/10* (2013.01); *H04B 1/385* (2013.01); *H04B 2001/3866* (2013.01)

(58) Field of Classification Search
CPC ........ H04W 4/10; H04W 4/80; H04W 76/45; H04B 1/385; H04B 2001/3866; H04B 1/3827; H04B 2001/3872; H04B 7/14; H04M 3/568
See application file for complete search history.

(56) References Cited

U.S. PATENT DOCUMENTS 9,998,577 B1  6/2018 Harmke
10,326,886 B1*  6/2019 John Chuan ........ H04L 65/1045
10,546,581 B1*  1/2020 Gejji ................... G10L 21/0208
(Continued)

OTHER PUBLICATIONS

International Search Report for PCT International Application No. PCT/IB2020/057374, dated Oct. 30, 2020, 3 pages.

*Primary Examiner* — Andrew Wendell
(74) *Attorney, Agent, or Firm* — Johannes P. M. Kusters; David B. Patchett

(57) ABSTRACT

A system, mobile radio, remote speaker microphone and wearable mask are provided. In one or more embodiments, a mobile radio is provided. A mobile radio is provided and includes communication interface configured to: receive at least one of first wireless audio signals from a wearable mask and second wireless audio signals from another mobile radio; and processing circuitry in operative communication with the communication interface, the processing circuitry configured to, if first wireless audio and second wireless audio signals are received by the communication interface, sum the first and second wireless audio signals for transmission to a remote speaker microphone if a first criterion is met.

10 Claims, 5 Drawing Sheets

(56) References Cited

U.S. PATENT DOCUMENTS

| | | |
|---|---|---|
| 2005/0096069 A1 | 5/2005 | Birli et al. |
| 2009/0052714 A1* | 2/2009 | Wilbur ................... H04B 1/385 381/364 |
| 2010/0094443 A1* | 4/2010 | Oh ......................... H04M 3/56 379/202.01 |
| 2010/0108065 A1* | 5/2010 | Zimmerman .......... A62B 18/08 128/204.23 |
| 2010/0150383 A1* | 6/2010 | Sampat .................... H04R 1/10 381/311 |
| 2013/0045724 A1* | 2/2013 | Na ...................... H04M 1/2535 455/414.1 |
| 2015/0104034 A1 | 4/2015 | Jennings |
| 2016/0057265 A1* | 2/2016 | Gibbons ................. H04R 3/04 455/557 |
| 2017/0178639 A1* | 6/2017 | Atti ....................... G10L 19/167 |
| 2017/0279950 A1 | 9/2017 | Auranen |
| 2017/0296094 A1 | 10/2017 | Fonzi, III |
| 2019/0387344 A1* | 12/2019 | Kim ........................ H04R 5/04 |
| 2020/0315266 A1* | 10/2020 | McMahon .......... A41D 13/1161 |
| 2020/0376335 A1* | 12/2020 | Wan .................. A63B 71/0622 |

\* cited by examiner

MOBILE RADIO

TECHNICAL FIELD

This disclosure relates to a method and system for communicating wireless audio signals.

INTRODUCTION

FIG. 1 is a diagram of an existing system 1 including one or more mobile radios 2a-2b (collectively referred to as mobile radio 2), remote speaker microphone 3 (RSM 3) and mask 4. RSM 3 includes speaker 5 for outputting audio signals and microphone(s) 6 for capturing audio signals, as is known in the art. Mask 4a includes microphone(s) 10 to receive user audio input and speaker(s) 7A for outputting audio signals amplified from by amplifier 8. Another embodiment of mask 4b includes similar elements as mask 4b where like reference designators represent like elements. Mask 4b includes speaker(s) 7B for outputting audio signals (unamplified signals) received from the radio 2a via communication interface. The amplified audio signals output from speaker 7A allow the user of mask 4 to hear oneself.

RSM 3 and mobile radio 2 operate using half duplex communication where communications occur in one direction at a time. For example, when a Push To Talk (PTT) button 9 is pressed at RSM 3, RSM 3 is transmitting audios signals to mobile radio 2. However, when the PTT button 9 is not pressed, i.e., not activated, RSM 3 may be receiving audio signals from mobile radio 2.

However, this existing configuration has drawbacks. For example, the amplifier 8 is bulky such that it adds unwanted weight to mask 4. Further, amplifier 8 will drain the limited power resources at mask 4.

SUMMARY

Some embodiments advantageously provide a method and system for communicating wireless audio signals. According to one embodiment of this aspect, A mobile radio is provided and includes a communication interface configured to: receive at least one of first wireless audio signals from a wearable mask and second wireless audio signals from another mobile radio; and processing circuitry in operative communication with the communication interface, the processing circuitry configured to, if first wireless audio and second wireless audio signals are received by the communication interface, sum the first and second wireless audio signals for transmission to a remote speaker microphone if a first criterion is met.

According to one or more embodiments of the disclosure, the processing circuitry is further configured to cause transmission of the second wireless audio signals to the remote speaker microphone without the summing if at least one of the first wireless audio signals are not received and the first criterion is not met. According to one or more embodiments of the disclosure, the first criterion corresponds to at least one of whether the second wireless audio signals have a higher priority than the first wireless audio signals and whether a push to talk (PTT) button has been activated. According to one or more embodiments of the disclosure, the first wireless audio signals are received directly from the wearable mask using a first wireless communication protocol. According to one or more embodiments of the disclosure, the first wireless communication protocol is BLUETOOTH. According to one or more embodiments of the disclosure, the first wireless audio signals associated with the wearable mask correspond to continuous wireless audio signals over a predefined time.

According to another aspect of the disclosure, a method for a mobile radio is provided. At least one of first wireless audio signals is received from a wearable mask and second wireless audio signals from another mobile radio. If first wireless audio and second wireless audio signals are received by the communication interface, the first and second wireless audio signals are summed for transmission to a remote speaker microphone if a first criterion is met.

According to one or more embodiments of the disclosure, the processing circuitry is further configured to cause transmission of the second wireless audio signals to the remote speaker microphone without the summing if at least one of the first wireless audio signals are not received and the first criterion is not met. According to one or more embodiments of the disclosure, the first criterion corresponds to at least one of whether the second wireless audio signals have a higher priority than the first wireless audio signals and whether a push to talk (PTT) button has been activated. According to one or more embodiments of the disclosure, the first wireless audio signals are received directly from the wearable mask using a first wireless communication protocol. According to one or more embodiments of the disclosure, the first wireless communication protocol is BLUETOOTH. According to one or more embodiments of the disclosure, the first wireless audio signals associated with the wearable mask correspond to continuous wireless audio signals over a predefined time.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
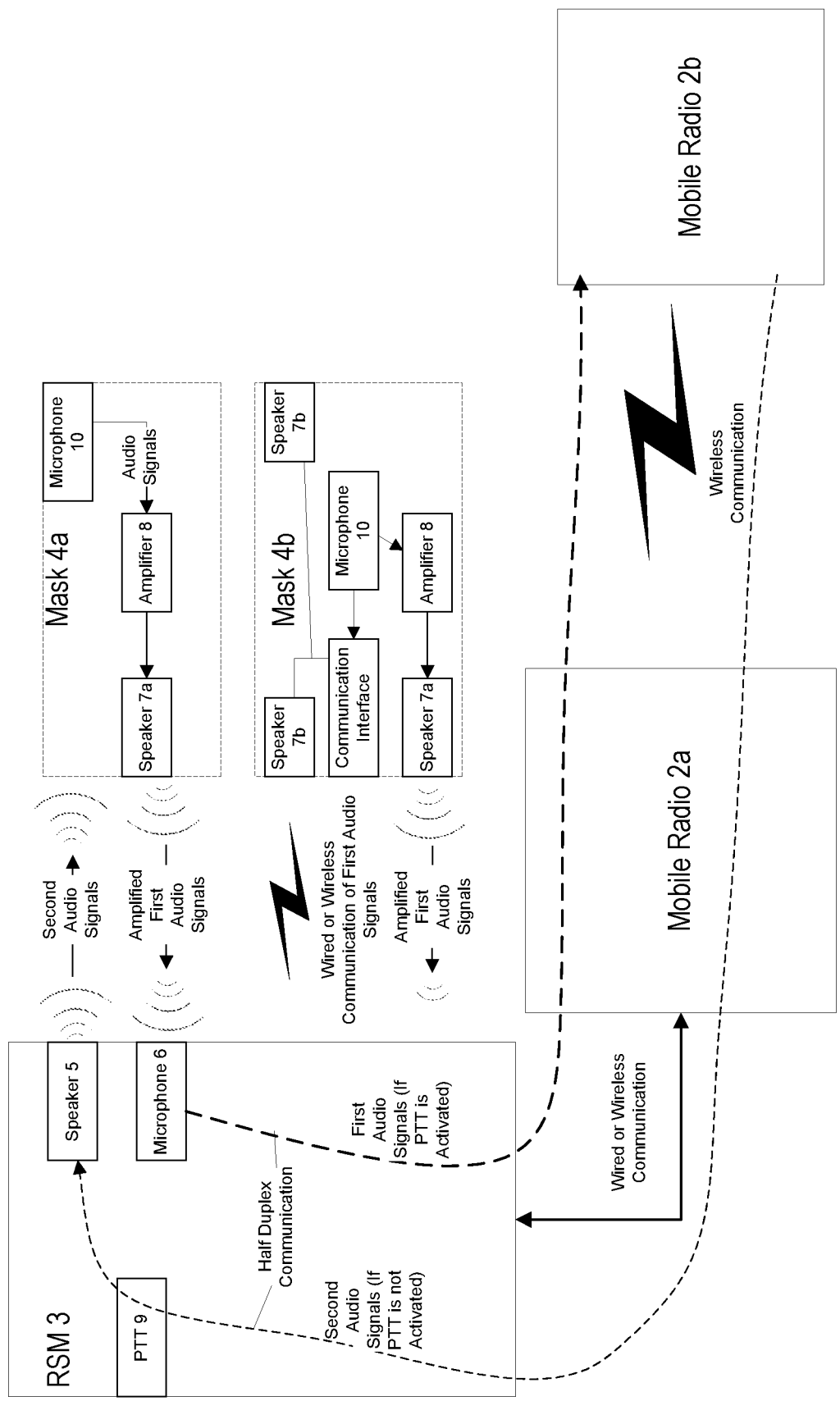
FIG. 1 is a block diagram of an existing system.

Before describing in detail exemplary embodiments, it is noted that the embodiments reside primarily in combinations of apparatus components and processing steps related to communicating wireless audio signals. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 2:
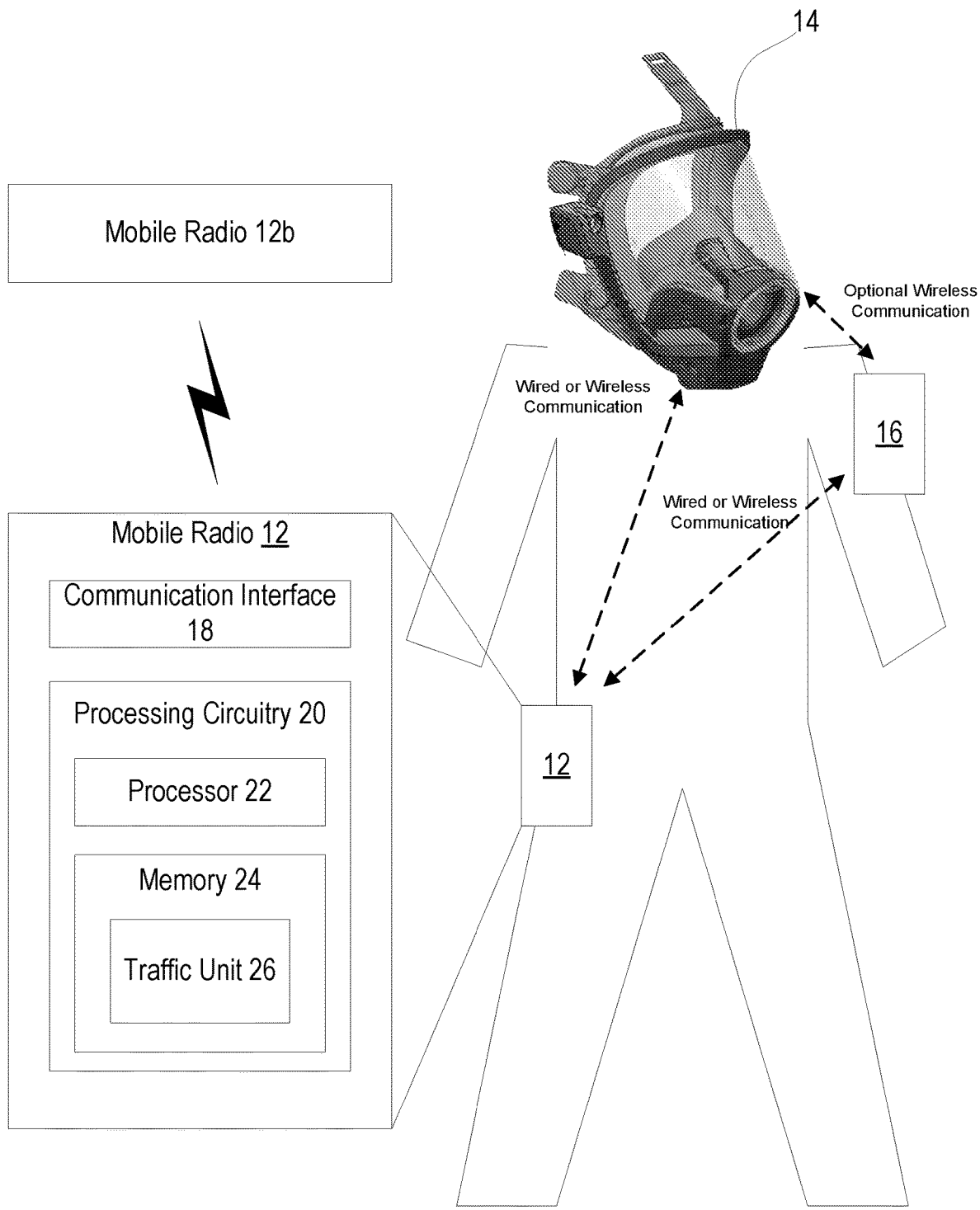
FIG. 2 is a block diagram of a system according to the principles of the invention.

Referring again to the drawing figures, in which like elements are referred to by like reference numerals, there is shown in FIG. 2 a schematic diagram of a system 10 according to one or more embodiments. System 10 includes mobile radios 12a-12b (collectively referred to as mobile radio 12) where mobile radio 12a may be in direct communication with wearable mask 14 and remote speaker microphone 16 (RSM 16) such as via one or more of wired and/or wireless communication using one or more communication protocols.

Mobile radio 12 includes a communication interface 18 that is configured to perform wired and/or wireless communication with wearable mask 14 and RSM 16 via one or more communication protocols such as via wired communication protocols and/or wireless communication protocols.

Mobile radio 12 includes processing circuitry 20. The processing circuitry 20 may include a processor 22 and a memory 24. In particular, in addition to or instead of a processor, such as a central processing unit, and memory, the processing circuitry 20 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 22 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the mobile radio 12 may further include software stored internally in, for example, memory 24. The software may be executable by the processing circuitry 20. The processing circuitry 20 may be configured to control any of the methods and/or processes described herein and/or to cause such methods, and/or processes to be performed, e.g., by mobile radio 12. Processor 22 corresponds to one or more processors 22 for performing mobile radio 12 functions described herein. The memory 24 is configured to store data, programmatic software code and/or other information described herein. In some embodiments, the software may include instructions that, when executed by the processor 22 and/or processing circuitry 20, causes the processor 22 and/or processing circuitry 20 to perform the processes described herein with respect to mobile radio 12. For example, processing circuitry 20 of the mobile radio 12 may include traffic unit 26 configured to perform one or more mobile radio 12 functions as described herein such as with respect to summing audio signals, as described herein.

Figure 3:
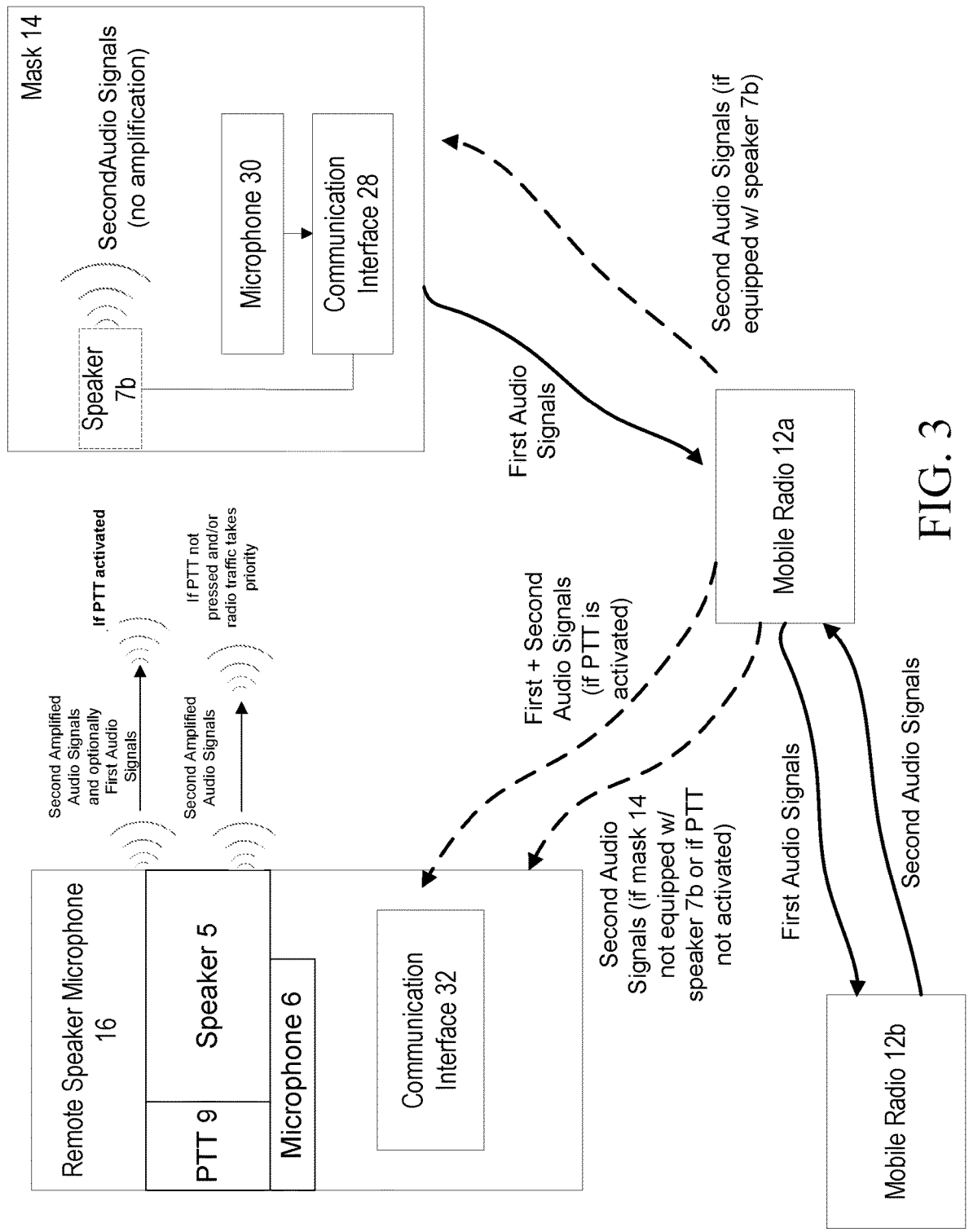
FIG. 3 is another block diagram of an example of the system according to the principles of the invention.

FIG. 3 is an example of an implementation of the system. As shown in FIG. 3, wearable mask 14 includes communication interface 28 for communicating with RSM 16 and/or Mobile radio 12 via wireless communication such as via one or more wireless communication protocols. In one or more embodiments, communication interface 28 communicates with mobile radio 12 using a wireless communication protocol such as BLUETOOTH, among other low power wireless communication protocols. In one or more embodiments, communication interface 28 is configured to provide full and/or half duplex audio. In one or more embodiments, the communication protocols implemented by communication interface 28 includes one or more of BLUETOOTH, WiFi, Cellular, NFC, etc. In one or more embodiments, communication interface 28 may optionally communicate with RSM 16 via one or more wireless communication protocols. Communication interface 28 may be in communication with speaker 7b for outputting second audio signals (i.e., signals from mobile radio 12b) that do not receive amplifier, as mask 14 may not include amplifier 8. Speaker 7b may correspond to a headphone speaker positioned in or proximate mask 14.

Wearable mask 14 includes microphone 30 for capturing audio signals from a user of wearable mask 14, as is known in the art. Although not shown, in some embodiments, wearable mask 14 may include processing circuitry, that includes a processor and memory, to control operation of the electronic aspects of the mask such as, for example, digital signal processing of the audio signals prior to transmission to optional speaker 7b or via communication interface 28. In one or more embodiments, mask 14 may not include speaker 7b.

In particular, in addition to or instead of a processor, such as a central processing unit, and memory, the processing circuitry of wearable mask 14 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor may be configured to access (e.g., write to and/or read from) the memory, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wearable mask 14 may further include software stored internally in, for example, memory. The software may be executable by the processing circuitry. The processing circuitry may be configured to control any of the methods and/or processes described herein and/or to cause such methods, and/or processes to be performed, e.g., by wearable mask 14. The processor corresponds to one or more processors for performing wearable mask 14 functions described herein. The memory is configured to store data, programmatic software code and/or other information described herein. In some embodiments, the software may include instructions that, when executed by the processor and/or processing circuitry, causes the processor and/or processing circuitry to perform the processes described herein with respect to wearable mask 14.

RSM 16 includes speaker 5 and microphone 6 discussed above. RSM 16 further includes communication interface 32 for communicating with mobile radio 12 and wearable mask 14 using one or more of wired and/or wireless communication via one or more of wired communication protocols and/or wireless communication protocols. RSM 16 further includes PTT 9 that is configured to modify how first and second audio signals are routed by mobile radio 12*a*, i.e., RSM 16 may send a PTT command or message to mask 14 via mobile radio 12*a* that alerts mobile radio 12*a* to modify routing of audio signals. As a first example, assuming that mask 14 is equipped with speaker 7*b*, mobile radio 12*a* may continuously or periodically route second audio signals to mask 14 for output by speaker 7*b*. In the first example, if PTT 9 is not activated, mobile radio 12*a* may also route second audio signals to RSM 16 for output via speaker 5, which has an associated amplifier 8 (not shown). In the first example, if PTT 9 is activated, mobile radio 12*a* receives first audio signals from mask 14 and sums the first and second audio signals for routing to RSM 16 for output via speaker 5.

In a second example of FIG. 3 where mask 14 does not include speaker 7*b*, second audio signals may be routed to RSM 16 via mobile radio 12*a* for output via speaker 5, where second audio signals will not be routed to speaker 7*b*. The remaining routing of audio signals is as described with respect to the first example. The dashed lines in FIG. 3 indicate optional routing of signals.

Figure 4:
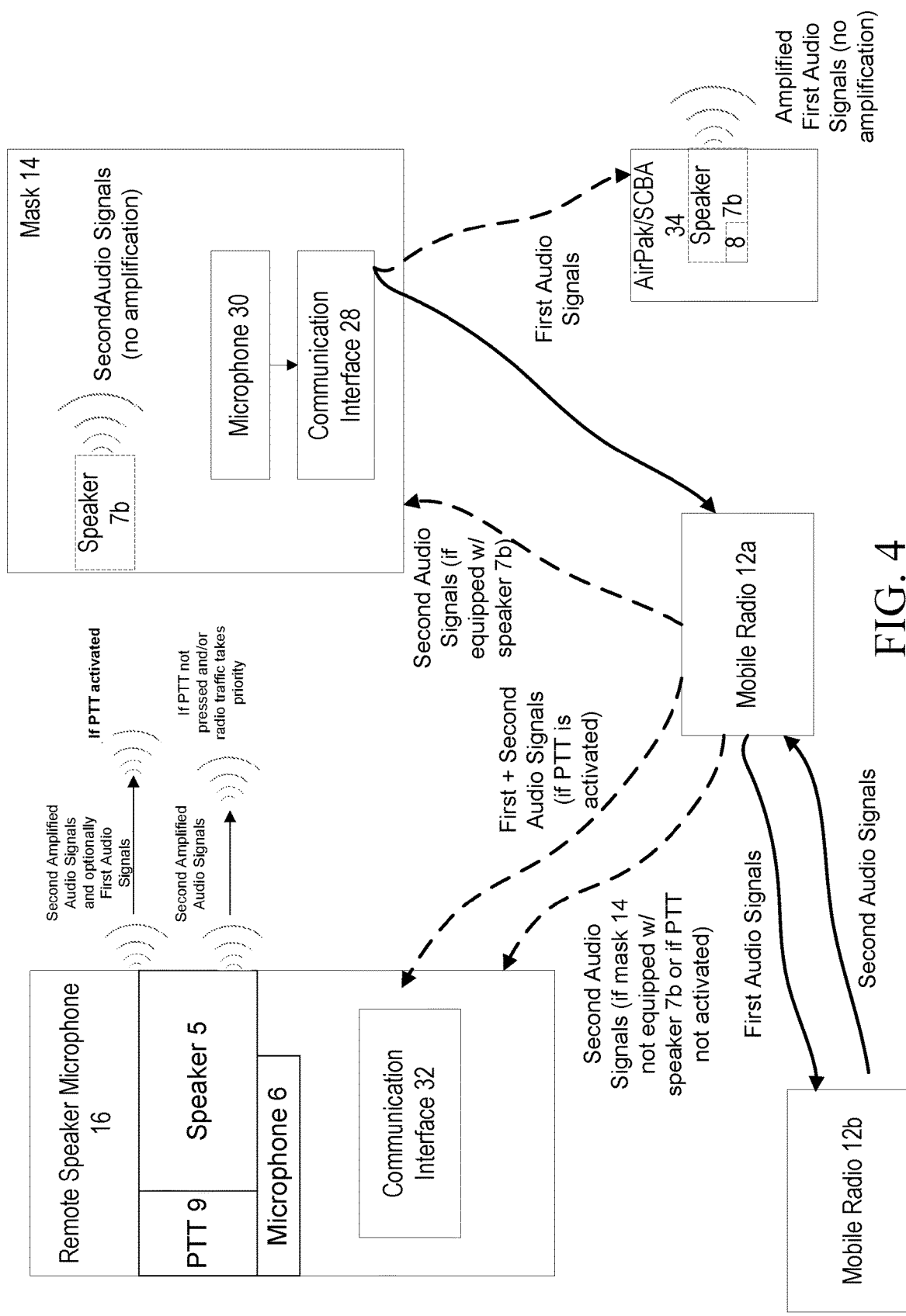
FIG. 4 is another block diagram of another example of the system according to the principles of the invention.

FIG. 4 is another diagram of an example of the system in accordance with one or more embodiments of the disclosure. In particular, FIG. 4 is based on FIG. 3 where like reference designators represent like elements. FIG. 4 further includes a configuration that may be triggered by receipt of a PTT command from RSM 16 via mobile radio 12*a* in which first audio signals may further be routed to speaker 7*b* in AirPak/Self-Contained Breathing Apparatus (SCBA) 34 where speaker 7*b* outputs amplified first audio signals. Other signal routing functionality may be the same as described with respect to FIG. 3.

Figure 5:
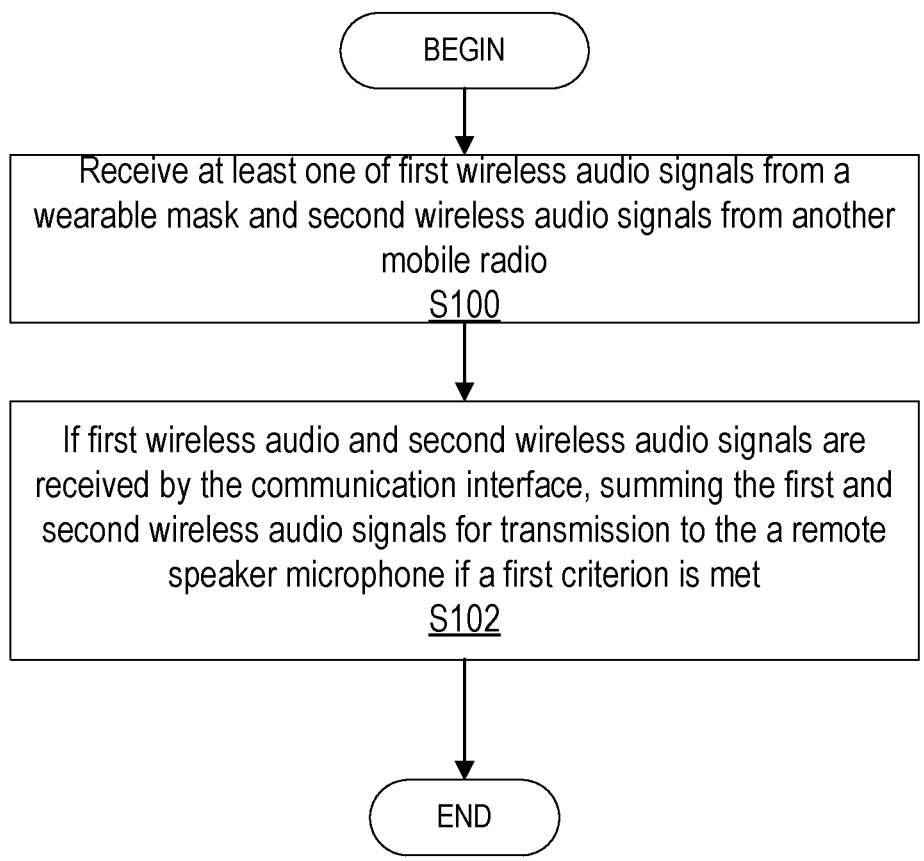
FIG. 5 is a flowchart of an example process according to the principles of the invention.

FIG. 5 is a flow diagram of an example process of mobile radio 12 according to one or more embodiments of the disclosure. One or more Blocks and/or functions performed by mobile radio 12 may be performed by one or more elements of mobile radio 12 such as by traffic unit 26, processing circuitry 20, processor 22, communication interface 18, etc. In one or more embodiments, mobile radio 12 such as via one or more of processing circuitry 20, processor 22, traffic unit 26, communication interface 18, etc. is configured to receive (Block S100) at least one of first wireless audio signals from a wearable mask and second wireless audio signals from another mobile radio, as described herein. In one or more embodiments, mobile radio 12 such as via one or more of processing circuitry 20, processor 22, traffic unit 26, communication interface 18, etc., is configured to, if first wireless audio signals and second wireless audio signals are received by the communication interface 18, sum (Block S102) the first and second wireless audio signals for transmission to a remote speaker microphone 16 if a first criterion is met, as described herein.

According to one or more embodiments of the disclosure, the processing circuitry 20 is further configured to cause transmission of the second wireless audio signals to the remote speaker microphone 16 without the summing if at least one of the first wireless audio signals are not received and the first criterion is not met. According to one or more embodiments of the disclosure, the first criterion corresponds to at least one of whether the second wireless audio signals have a higher priority than the first wireless audio signals and whether a push to talk (PTT) button has been activated. According to one or more embodiments of the disclosure, the first wireless audio signals are received directly from the wearable mask 14 using a first wireless communication protocol.

According to one or more embodiments of the disclosure, the first wireless communication protocol is BLUETOOTH. According to one or more embodiments of the disclosure, the first wireless audio signals associated with the wearable mask 14 correspond to continuous wireless audio signals over a predefined time.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A mobile radio, comprising:
a communication interface configured to:
   receive at least one of first wireless audio signals from a wearable mask and second wireless audio signals from another mobile radio; and
processing circuitry in operative communication with the communication interface, the processing circuitry configured to, if first wireless audio and second wireless audio signals are received by the communication interface, sum the first and second wireless audio signals for transmission to a remote speaker microphone if a first criterion is met, wherein the first criterion corresponds to at least one of whether the second wireless audio signals have a higher priority than the first wireless audio signals and whether a push to talk (PTT) button has been activated.

2. The mobile radio of claim 1, wherein the processing circuitry is further configured to cause transmission of the second wireless audio signals to the remote speaker microphone without the summing if at least one of the first wireless audio signals are not received and the first criterion is not met.

3. The mobile radio of claim 1, wherein the first wireless audio signals are received directly from the wearable mask using a first wireless communication protocol.

4. The mobile radio of claim 3, wherein the first wireless communication protocol is BLUETOOTH.

5. The mobile radio of claim 1, wherein the first wireless audio signals associated with the wearable mask correspond to continuous wireless audio signals over a predefined time.

6. A method for a mobile radio, comprising:
receiving at least one of first wireless audio signals from a wearable mask and second wireless audio signals from another mobile radio; and
if first wireless audio and second wireless audio signals are received by the communication interface, summing the first and second wireless audio signals for transmission to a remote speaker microphone if a first criterion is met, wherein the first criterion corresponds to at least one of whether the second wireless audio signals have a higher priority than the first wireless audio signals and whether a push to talk (PTT) button has been activated.

7. The method of claim 6, causing transmission of the second wireless audio signals to the remote speaker microphone without the summing if at least one of the first wireless audio signals are not received and the first criterion is not met.

8. The method of claim 6, wherein the first wireless audio signals are received directly from the wearable mask using a first wireless communication protocol.

9. The method of claim 8, wherein the first wireless communication protocol is BLUETOOTH.

10. The method of claim 6, wherein the first wireless audio signals associated with the wearable mask correspond to continuous wireless audio signals over a predefined time.

* * * * *